US012731075B2

(12) United States Patent
Hoogerbrugge et al.

(10) Patent No.: US 12,731,075 B2
(45) Date of Patent: Sep. 8, 2026

(54) METHOD FOR DETECTING NON-PROBLEM DOMAIN DATA IN A MACHINE LEARNING MODEL

(71) Applicant: NXP B.V., Eindhoven (NL)

(72) Inventors: Jan Hoogerbrugge, Helmond (NL); Wilhelmus Petrus Adrianus Johannus Michiels, Reusel (NL)

(73) Assignee: NXP B.V., Eindhoven (NL)

( * ) Notice: Subject to any disclaimer, the term of this patent is extended or adjusted under 35 U.S.C. 154(b) by 900 days.

(21) Appl. No.: 18/156,767

(22) Filed: Jan. 19, 2023

(65) Prior Publication Data

US 2024/0249184 A1 Jul. 25, 2024

(51) Int. Cl.

| | |
|---|---|
| ***G06N 20/00*** | (2019.01) |
| ***G06N 3/045*** | (2023.01) |
| ***G06N 3/0464*** | (2023.01) |
| ***G06N 3/082*** | (2023.01) |
| ***G06N 3/094*** | (2023.01) |
| *H04L 9/40* | (2022.01) |

(52) U.S. Cl.

CPC ............ *G06N 20/00* (2019.01); *G06N 3/045* (2023.01); *G06N 3/0464* (2023.01); *G06N 3/082* (2013.01); *G06N 3/094* (2023.01); *H04L 63/1416* (2013.01)

(58) Field of Classification Search

CPC ...... G06N 20/00; G06N 3/045; G06N 3/0464; G06N 3/082; G06N 3/094; H04L 63/1416

See application file for complete search history.

(56) References Cited

U.S. PATENT DOCUMENTS

| | | | |
|---|---|---|---|
| 10,769,310 B2 | 9/2020 | Michiels et al. | |
| 11,100,222 B2 | 8/2021 | Joye et al. | |
| 11,321,456 B2 | 5/2022 | Derks et al. | |
| 11,468,291 B2 | 10/2022 | Michiels et al. | |
| 11,501,212 B2 | 11/2022 | Van Vredendaal et al. | |
| 2019/0058715 A1* | 2/2019 | Abbaszadeh | H04L 63/1416 |
| 2019/0171929 A1* | 6/2019 | Abadi | G06N 3/0455 |
| 2019/0362269 A1* | 11/2019 | Barad | G06N 20/20 |

(Continued)

OTHER PUBLICATIONS

Pal, Soham, et al. "Activethief: Model extraction using active learning and unannotated public data." Proceedings of the AAAI conference on artificial intelligence. vol. 34. No. 01. 2020. (Year: 2020).*

(Continued)

*Primary Examiner* — Andrew L Tank

(57) ABSTRACT

A method is provided for detecting non-problem domain (NPD) data in a machine learning (ML) model. The method includes training the ML model using problem domain (PD) training data. A second fully connected layer is added to the trained ML model in parallel with a first fully connected layer in the trained ML model. The trained ML model is retrained with NPD training data while preventing weights in the ML model from changing except for weights of the second fully connected layer. An inference operation is performed with the retrained ML model. Output vectors are received from the first and second fully connected layers via a Softmax layer. A metric is computed using the output vectors. The metric is compared to a threshold metric to determine if input samples are PD or NPD. An indication is provided when NPD data is detected. In another embodiment, a ML model is provided.

20 Claims, 6 Drawing Sheets

(56) References Cited

U.S. PATENT DOCUMENTS

| | | | | |
|---|---|---|---|---|
| 2020/0233936 | A1* | 7/2020 | Veshchikov | G06F 18/2155 |
| 2020/0327443 | A1 | 10/2020 | Van Vredendaal et al. | |
| 2021/0019661 | A1* | 1/2021 | Bos | G06N 3/08 |
| 2021/0034721 | A1* | 2/2021 | Bos | G06N 3/082 |
| 2021/0089957 | A1* | 3/2021 | Ermans | G06N 3/0464 |
| 2021/0157912 | A1* | 5/2021 | Kruthiveti Subrahmanyeswara Sai | G06N 20/00 |
| 2022/0156376 | A1* | 5/2022 | Dos Santos Silva | G06F 21/566 |

OTHER PUBLICATIONS

Juuti, Mika, et al. "PRADA: protecting against DNN model stealing attacks." 2019 IEEE European Symposium on Security and Privacy (EuroS&P). IEEE, 2019. (Year: 2019).*

Meng, Dongyu, and Hao Chen. "Magnet: a two-pronged defense against adversarial examples." Proceedings of the 2017 ACM SIGSAC conference on computer and communications security. 2017. (Year: 2017).*

Grosse, Kathrin, et al. "On the (statistical) detection of adversarial examples." arXiv preprint arXiv:1702.06280 (2017). (Year: 2017).*

Teerapittayanon, Surat, Bradley McDanel, and Hsiang-Tsung Kung. "Branchynet: Fast inference via early exiting from deep neural networks." 2016 23rd international conference on pattern recognition (ICPR). IEEE, 2016. (Year: 2016).*

Correia-Silva, Jacson Rodrigues et al.; "Copycat CNN: Stealing Knowledge by Persuading Confession with Random Non-Labeled Data"; https://arxiv.org/abs/1806.05476v1, Jun. 14, 2018; https://doi.org/10.48550/arXiv.1806.05476.

Orekondy, Tribhuvanesh et al.; "Knockoff Nets: Stealing Functionality of Black-Box Models"; https://arxiv.org/abs/1812.02766v1; Dec. 6, 2018; https://doi.org/10.48550/arXiv.1812.02766.

Tramer, Florian et al.; "Stealing Machine Learning Models via Prediction APIs"; https://arxiv.org/abs/1609.02943v2; Oct. 3, 2016; https://doi.org/10.48550/arXiv.1609.02943.

U.S. Appl. No. 18/051,531; Inventor Wilhelmus Petrus Adrianus Johannus Michiels et al.; "Method for Protecting a Machine Learning Model From Being Copied;" filed Nov. 1, 2022.

U.S. Appl. No. 18/067,043; Inventor Jan Hoogerbrugge et al.; "Method and System for Protecting a Machine Learning Model Against Extraction;" filed Dec. 16, 2022.

* cited by examiner

METHOD FOR DETECTING NON-PROBLEM DOMAIN DATA IN A MACHINE LEARNING MODEL

BACKGROUND

Field

This disclosure relates generally to machine learning (ML), and more particularly, to a method for detecting non-problem domain (NPD) data used as input to a ML model.

Related Art

Machine learning models can be valuable assets that need protection from copying on systems where they are used for inference. There are various methods for an attacker to copy a ML model from a device. One method is a so-called API (application programming interface) attack where an attacker feeds the inference process with a data stream $x_i$ and captures the corresponding inference results $y_i$. Typically, for a successful attack, a few hundred thousand or million $x_i$, $y_i$ pairs need to be collected. With these pairs the attacker trains a new model which is a clone of the original model. With sufficient $x_i$, $y_i$ pairs and a properly configured training process, the cloned model can have a similar accuracy as the copied ML model. Normally, a ML model is trained with, and intended to be used for, a particular class of input data which is commonly called problem domain (PD) data. An API attack can be performed on an ML model with data that is not PD data, but so called non-problem domain (NPD) data. NPD data is available in large quantities in open-source data sets such as ImageNet. Access to the ML model is not necessary except for access to the inputs and outputs. Hence, whereas the model developer is faced with the costly task of creating a high-quality PD data set, a copyist can resort to a set of arbitrary data that is cheaper and easier to obtain. The copyist can illegitimately monetize the copy of the ML model. For instance, the copy may be implemented on a competing device or by offering the copy as a service via the cloud (ML-as-a-service). Since the investment of the copyist to obtain the copy of the ML model is much lower than that of the developer, the copyist has a competitive advantage over the developer of the copied ML model.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
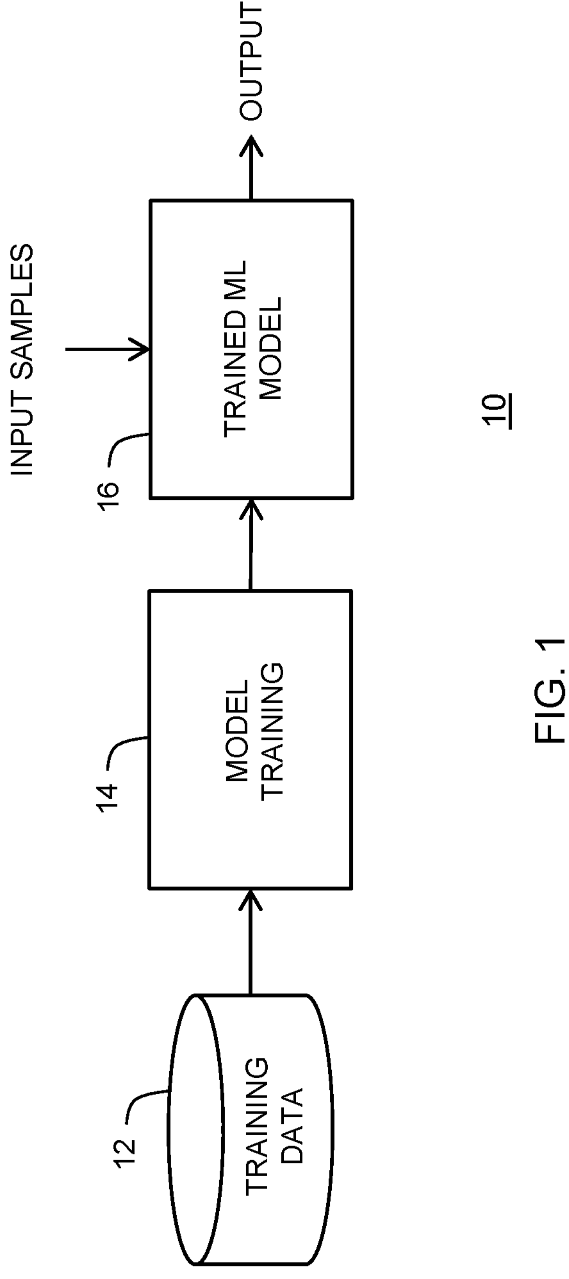
FIG. 1 illustrates a block diagram of a simplified ML system for training and using a ML model in accordance with an embodiment.

Generally, there is provided, a method for detecting whether input samples provided to a machine learning (ML) are in a problem domain or a non-problem domain. The ML model may include a neural network (NN) having an input layer, a plurality of intermediate layers, a first fully connected (FC) layer, and a first softmax layer for providing first classification probabilities. The ML model is trained using first training data having classifications in a predetermined problem domain to provide a trained ML model. The training of the ML model adjusts weights associated with nodes of the layers of the NN. The trained ML model is ready for inference operation on PD input samples. To provide NPD data detection, the trained ML model is extended with a second FC layer connected in parallel with the first FC layer in the trained ML model. A second softmax layer is connected to outputs of the first and second FC layers for providing a first output vector and a second output vector, respectively. With the additional FC layer, the trained ML model is retrained using second training data while the weights of all layers of the previously trained ML model are prevented from being changed by the training except for weights of the added second FC layer. The retrained ML model provides second classification probabilities from the second softmax layer. The second training data classifications are not in the same problem domain as the first training data and preferably are unrelated to the first training data.

The retrained ML model may then be used for detecting an attempt to copy the ML model. After the retraining, a plurality of input samples is provided to an input of the retrained ML model for an inference operation. An output vector from the second softmax layer of the retrained ML model is provided for each input sample of the plurality of input samples. A metric is computed using the first and second output vectors from the second softmax layer. In one embodiment, the metric is based on mean values of the first and second output vectors. The metric is compared to a threshold metric to determine if the plurality of input samples is in the PD or not in the PD. If the comparison indicates the plurality of input samples is not in the PD, then an attempt to extract, or copy, the ML model may be underway and an indication may be provided. In response, an action may be taken to protect the ML model from copying. Because an occasional detected NPD input sample does not necessarily mean that an attempt at copying is underway, in one embodiment, a predetermined number of NPD input samples are detected before an indication is provided.

In accordance with an embodiment, there is provided, a method for detecting non-problem domain input samples provided to a machine learning (ML), the method including: training the ML model using problem domain training data to provide a trained ML model, wherein the trained ML model having a first fully connected layer and a first softmax layer for providing first classification predictions; adding a second fully connected layer to the trained ML model in parallel with the first fully connected layer, and a second softmax layer connected to an output of the first fully connected layer for providing a first output vector and to an output of the second fully connected layer for providing a second output vector; retraining the trained ML model using non-problem domain training data that is not in the problem domain to provide a retrained ML model for providing second classification predictions from the second softmax layer, wherein weights of all layers of the ML model are prevented from being changed during the retraining except for weights of the second fully connected layer; providing a plurality of input samples to an input of the retrained ML model for an inference operation; receiving an output vector from the second softmax layer of the retrained ML model; computing a metric using the first and second output vectors from the second softmax layer; and comparing the metric to a threshold metric to determine if the plurality of input samples are problem domain or non-problem domain. Computing the metric may further include taking a first mean value of the first output vector, taking a second mean value of the second output vector, and computing a proportion using the first and second mean values. The method may further include taking a logarithm of the proportion. Computing the metric may further include subtracting a first mean of the second output vector from a second mean of the first output vector. Computing the metric may further include subtracting a sum of the second output vector from a sum of the first output vector. Computing the metric may further include taking a proportion using a sum of the second output vector and a sum of the first output vector. The method may further include taking a logarithm of the proportion. The ML model may include a neural network. The non-problem domain training data may include classes of samples not related to classes of samples the problem domain training data. The method may further include taking an action to protect the ML model including one or more of limiting a number of input samples within a time window, reporting the copying attempt to a host processor, and substituting a lower quality ML model.

In another embodiment, there is provided, a machine learning (ML) model including: an input layer for receiving input samples; a plurality of intermediate layers coupled to the input layer; a first fully connected layer coupled to an output of a final intermediate layer, wherein the first fully connected layer includes weights trained using problem domain data; a second fully connected layer coupled to the output of the final intermediate layer, wherein the second fully connected layer includes weights trained using non-problem domain data; a softmax layer coupled to an output of the first fully connected layer for output a first vector, and to an output of the second fully connected layers for outputting a second vector; a non-problem domain detector coupled to receive the first and second vectors and to compute a metric using the first and second vectors; and a comparator for comparing the metric to a threshold, wherein non-problem domain samples are detected when the metric does not compare favorably to the threshold. The metric may further include taking a first mean value of elements of the first vector, taking a second mean value of elements of the second vector, and taking a proportion using the first and second mean values. The ML model may further include the non-problem domain detector taking a logarithm of the proportion. The metric may further include a subtraction of a first mean value of elements of the second vector from a second mean value of elements of the first vector. The metric may further include a subtraction of a sum of elements of the second output vector from a sum of elements of the first output vector. The metric further includes taking a proportion using a sum of elements of the second vector and a sum of elements of the first vector. The ML model may further include taking a logarithm of the proportion. The ML model may be used for image classification. The ML model may further include an action taken to protect the ML model includes one or more of limiting the number of samples that can be input in a given time window, reporting the copying attempt to a host processor, and substituting a lower quality ML model. The ML model may include a neural network.

FIG. 1 illustrates a block diagram of simplified ML system 10 for training and using a ML model in accordance with an embodiment. System 10 includes a labeled set of ML training data 12, model training block 14, and resulting trained ML model 16. In one embodiment, ML model 16 is implemented as a computer program including executable instructions stored on a non-transitory storage medium. In one example embodiment, ML model 16 includes an artificial neural network (NN) algorithm used to classify images. Trained ML model 16 may be loaded onto an integrated circuit device and used to recognize, for example, road signs in an automotive application. In another embodiment, ML model 16 may be used for a different task, such as speech tasks or sensor tasks.

Generally, a NN includes one or more input layers, one or more output layers, and one or more intermediate layers between the input and output layers, in accordance with an embodiment, trained ML model 16 may be a network including convolutional layers, fully connected layers, or other types of layers. Each layer can have any number of nodes, or neurons. Typically, each of the nodes includes an activation function. There can be any number of intermediate layers. Each intermediate layer can include any number of nodes and concludes with a last hidden or last intermediate layer before one or more output layers. There can be any number of output nodes in the output layers. Typically, the number of output nodes is equal to the number of classes in a NN used for classification. Neural networks may also be used for other applications, such as object detectors.

An ML model is trained in model training 14 using training data 12 comprising, e.g., a plurality of labeled images. Training data 12 may include images that are labeled by classes, such as for example, bird, cat, dog, bus, traffic light, etc. If the ML model is to be used as an object detector, the training data includes images with more than one labeled object. After training, trained ML model 16 can be used for inference operations. In an inference operation, one or more input samples labeled "INPUT SAMPLES" are input into ML model 16 and an output classification prediction labeled "OUTPUT" is provided by trained model 16.

Figure 2:
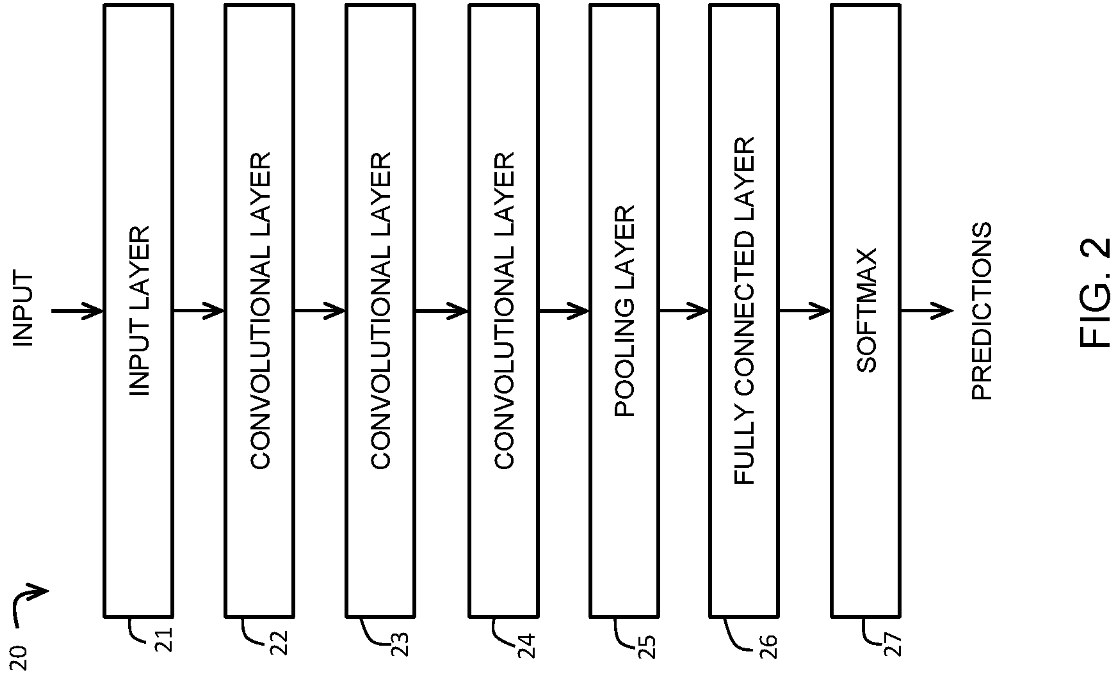
FIG. 2 illustrates a block diagram of layers of a neural network for use in an embodiment.

FIG. 2 illustrates a block diagram of layers of NN 20 for use in an embodiment. Neural network 20 includes input layer 21 for receiving a plurality of input samples (INPUT). The input samples may be images. Input layer 21 includes a plurality of connections to nodes of the first layer of a plurality of intermediate, or hidden, layers. Each layer of the plurality of intermediate layers includes a plurality of nodes, or neurons. In one embodiment, the plurality of intermediate layers may be a plurality of convolutional layers, e.g., convolutional layers 22-24. Connections between the layers may include weights whose values are determined during training of NN 20. The illustrated embodiment includes a pooling layer 25. Pooling layer 25 may be, e.g., average pooling or max pooling, or global variants thereof. Another embodiment of NN 20 does not include pooling layer 25. Fully connected (FC) layer 26 is a last layer of NN 20 before Softmax layer 27. Softmax layer 27 has a number of output nodes that correspond with the number of classes and provides normalized output class predictions (PREDICTIONS). In one embodiment, a prediction from Softmax layer 27 indicates a normalized probability that a class prediction is correct. A machine learning model including NN 20 is trained with training data that is within a PD. Problem domain (PD) data samples are samples that are within a distribution of samples the ML model was trained on. Non-problem domain data (NPD) samples are samples that are not within a distribution of samples the ML model was trained on. After training, in the case where NN 20 is used for solving a computer vision task, the inputs of input layer 21 are images and the output of Softmax layer 27 is a vector of probabilities where every element of the vector corresponds to a class of images for which the ML model has been trained. The Softmax layer normalizes the probabilities such that the sum of the probabilities equals 1. The Softmax layer has no weights to train. As an example, an ML model trained to classify dogs and cats may provide a vector with two output elements, e.g., [a,b], where a represents a probability that an image is of a dog, and b represents a probability that the image is of a cat. The images may come from any source, e.g., a video camera, website, etc. In an example implementation, NN 20 is trained to classify images from the Imagenet data set.

Figure 3:
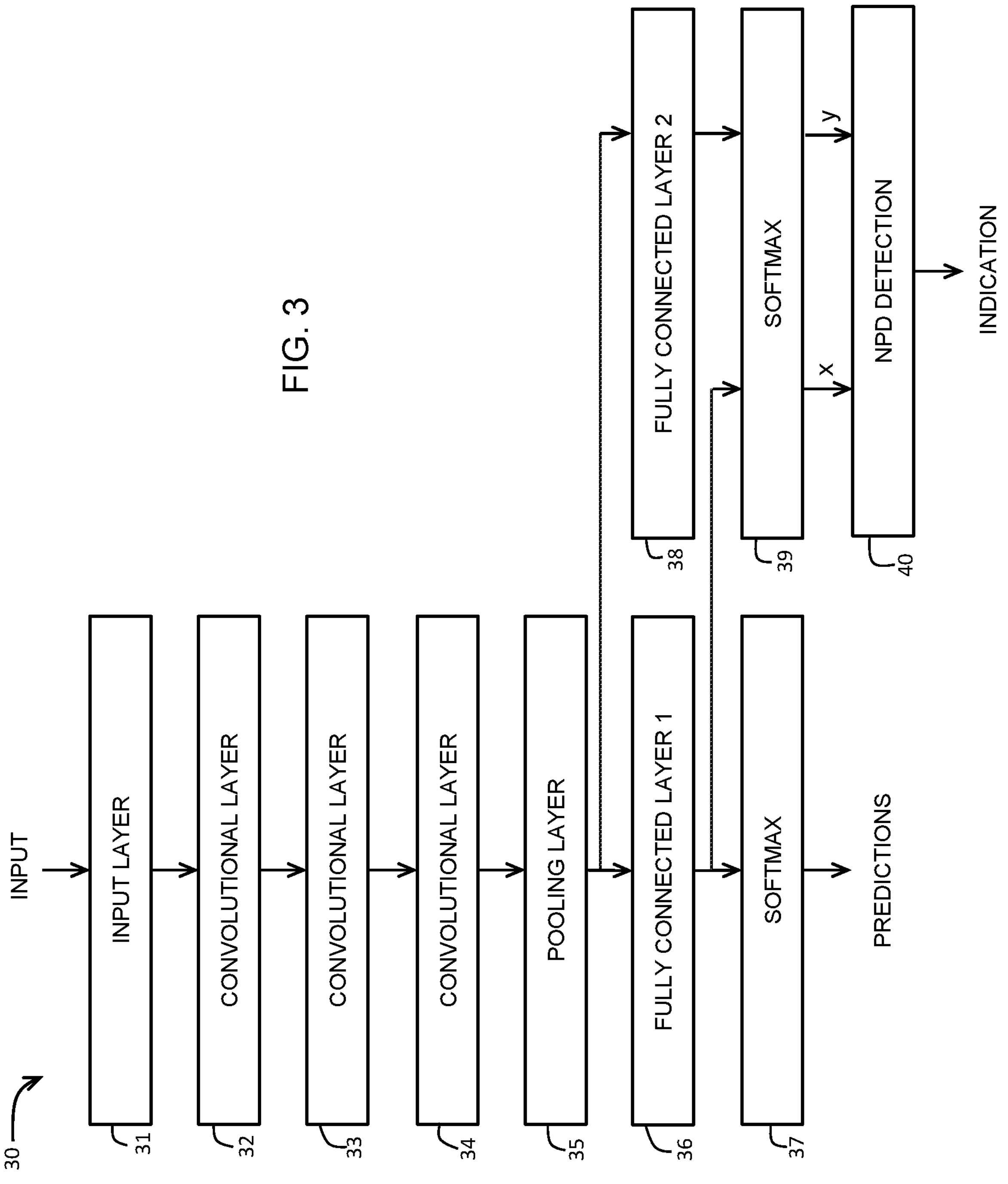
FIG. 3 illustrates a diagram of layers of a neural network extended with NPD detection in accordance with an embodiment.

According to an embodiment, in order to detect if the ML model is being copied, the trained ML model is extended with a new FC layer in parallel with the original FC layer of the NN as illustrated in FIG. 3. While the original FC layer has been trained with PD data, the new FC layer is trained with NPD data.

With the extended ML model, the new FC layer is trained with NPD data that is unrelated to the PD data. For example, the NPD data may not include any of the classifications of the PD data used to train the original ML model. While training, the values of the weights of all layers of the original model trained with the PD data are prevented from being changed. Only the weights of the new FC layer are adjusted by the training. This guarantees that the copy detection extension portion will not change the accuracy of the ML model if no API attack has been detected. Instead of training the newly added FC layer with just NPD data, the new FC layer may be trained with both PD and NPD data. However, this requires that the entity that applies the NPD detection method to the ML model has access to the PD training data.

FIG. 3 illustrates a diagram of layers of a neural network 30 that has been extended for detecting non-problem domain (NPD) samples in accordance with an embodiment. Neural network 30 includes input layer 31, convolutional layers 32-34, pooling layer 35, first FC layer 36, Softmax layer 37, and NPD detection circuit 40. To provide the ability to detect NPD data, the NN 30 is extended with second FC layer 48, Softmax layer 39, and NPD detection circuit 40. Note that the various specific layers of NN 30 are provided for illustration purposes. Other embodiments may include more layers and the layers may be different. For example, even though three convolutional layers are shown in FIG. 3, there can be any number of convolutional layers. Pooling layer 35 may be, for example, an average pooling layer or max pooling layer. In one embodiment, neural network 30 is for classifying input images. An input sample labeled "INPUT" may be provided to an input of input layer 31. Softmax layer 37 provides prediction probability vectors PREDICTIONS regarding the classification of the input samples. In one embodiment, neural network 30 may be, for example, an architecture such as MobileNet v1 running applications on a microprocessor or microcontroller. In another embodiment, NN 30 may be implemented in a server or cloud environment.

Fully connected layer 38, Softmax layer 39, and NPD detection block 40 are made a part of NN 30 after NN 30 is trained with a PD dataset. Softmax layer 39 has inputs connected to both the first FC layer 36 and the second FC layer 38, an output for providing an output vector labeled "x" that corresponds to an output classification from first FC layer 36, and an output for providing an output vector labeled "y" that corresponds to an output classification from second FC layer 38. Each output vector includes an element corresponding to each output classification the ML model is trained to provide. The element is a normalized value related to a probability the output classification prediction is correct as discussed above.

Output vectors x and y are provided to NPD detection circuit block 40. NPD detection circuit block 40 may be implemented using combinational logic. NPD detection circuit block 40 may also be implemented in software or a combination of hardware and software. The output probabilities of an input PD data sample correspond to output vector x and the output probabilities of an input NPD data sample correspond with output vector y. In one embodiment of NPD detection circuit block 40, a mean value of elements of both vectors x and y is taken, the mean values are divided, and the logarithm taken to compute the metric M, that is:

$$M = \log(\text{mean }(x)/\text{mean }(y)).$$

Figure 4:
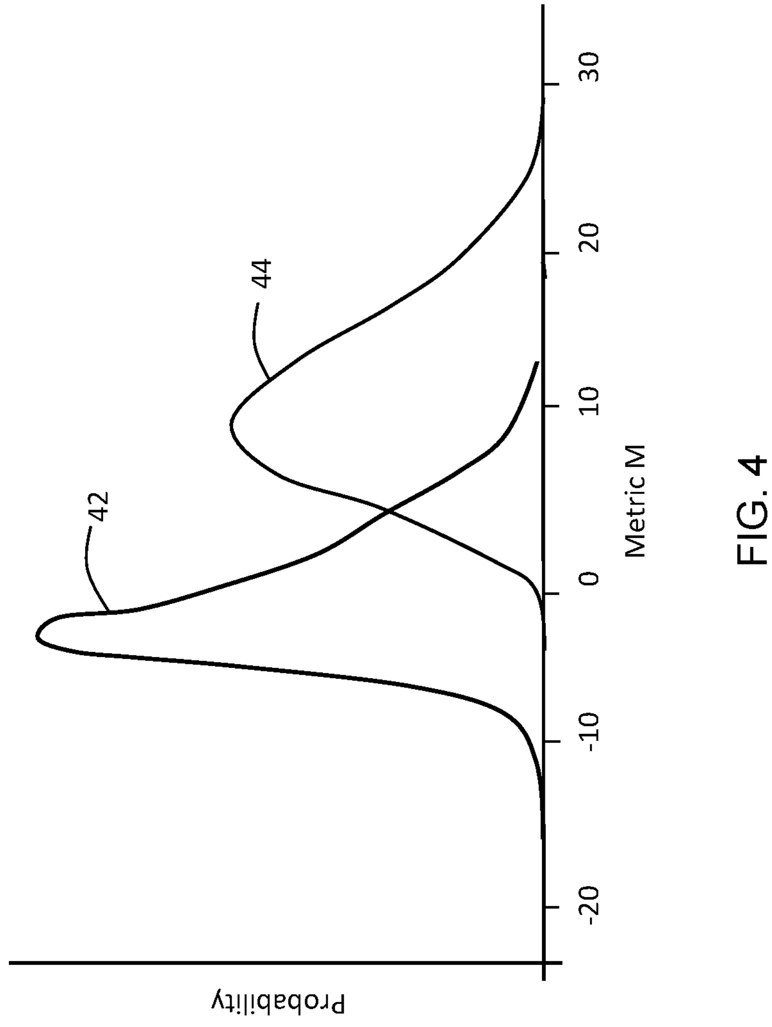
FIG. 4 illustrates a graph of example distributions of a metric M for PD and NPD data.

The metric M is computed for each output vector x and y from Softmax 39. The metric M is provided to a comparator in NPD detection circuit block 40 and compared to a threshold metric M value. If the computed metric M is lower than the threshold metric M value, then the corresponding input sample is likely to be NPD data. It turns out that the distributions of M for PD and NPD data are quite different from each other as illustrated in FIG. 4 and discussed below. When an NPD data sample is detected, an indication may be provided so that appropriate action may be taken.

FIG. 4 illustrates a graph of example distributions of metric M for PD and NPD data. This graph shows distribution 44 of metric M for PD data, which are in this case 13 classes of monkey species. As shown in FIG. 4, most values of M for distribution 44 are centered around 10. Note that numbers on the horizontal metric M scale are for reference only and may be different in other embodiments. The lowest value of distribution 44 of metric M that has been observed for PD data is around −4. For distribution 42 of metric M for NPD data, 10 random classes of images from ImageNet (elephants, ambulances, etc.) were used. The distribution 44 of metric M for NPD data is quite different from distribution 42 for metric M for PD data. In this case 44% of distribution 42 for all NPD data has a metric M value below the lowest value of distribution 44 for metric M for PD data, which is −4. By selecting a threshold value below this, e.g., −8, and measuring how often metric M is below this threshold, NPD data can be detected. For NPD data, the metric M should be below the threshold frequently, and for the metric M of PD data should be below the threshold rarely or never. So, if metric M is frequently below the threshold value, it is assumed the ML model is under an API attack and appropriate action can be taken by, for example, modifying or permuting the probabilities of the PD data, slowing down the inference process to slowdown API attacks, or to inform a backend service about the threat. Note that in other implementations, the NPD data distribution may be centered above the threshold.

Experiments demonstrated that computing metric M=log (mean(x)/mean(y)) as described above was the most suitable metric for NPD data detection.

The following metrics are equivalent when compared against a threshold:

$$M = \log(\text{sum}(x)/\text{sum}(y)),$$

$$M = \text{mean}(x)/\text{mean}(y), \text{ and}$$

$$M = \text{sum}(x)/\text{sum}(y).$$

Also, replacing "mean" or "sum" by "max" (maximum value of a vector of probabilities) gives good results (metric M has a different distribution for PD and NPD data).

Using subtraction instead of division has also been shown to be effective, although less effective than the embodiments based on division:

$$M = \text{sum}(x) - \text{sum}(y), \text{ and}$$

$$M = \text{mean}(x) - \text{mean}(y).$$

In the case an API attack is detected, a device, such as a host processor, can then decide to either take action immediately, or to only take action after this has happened a given number of times. Example actions that can be taken include limiting the number of queries that can be made in a given time window (throttling), reporting the possible attack to a host processor, and moving inference operation to a lower-quality model. Furthermore, immediate action may be taken, or action may be taken only after a number of NPD samples have been detected.

Figure 5:
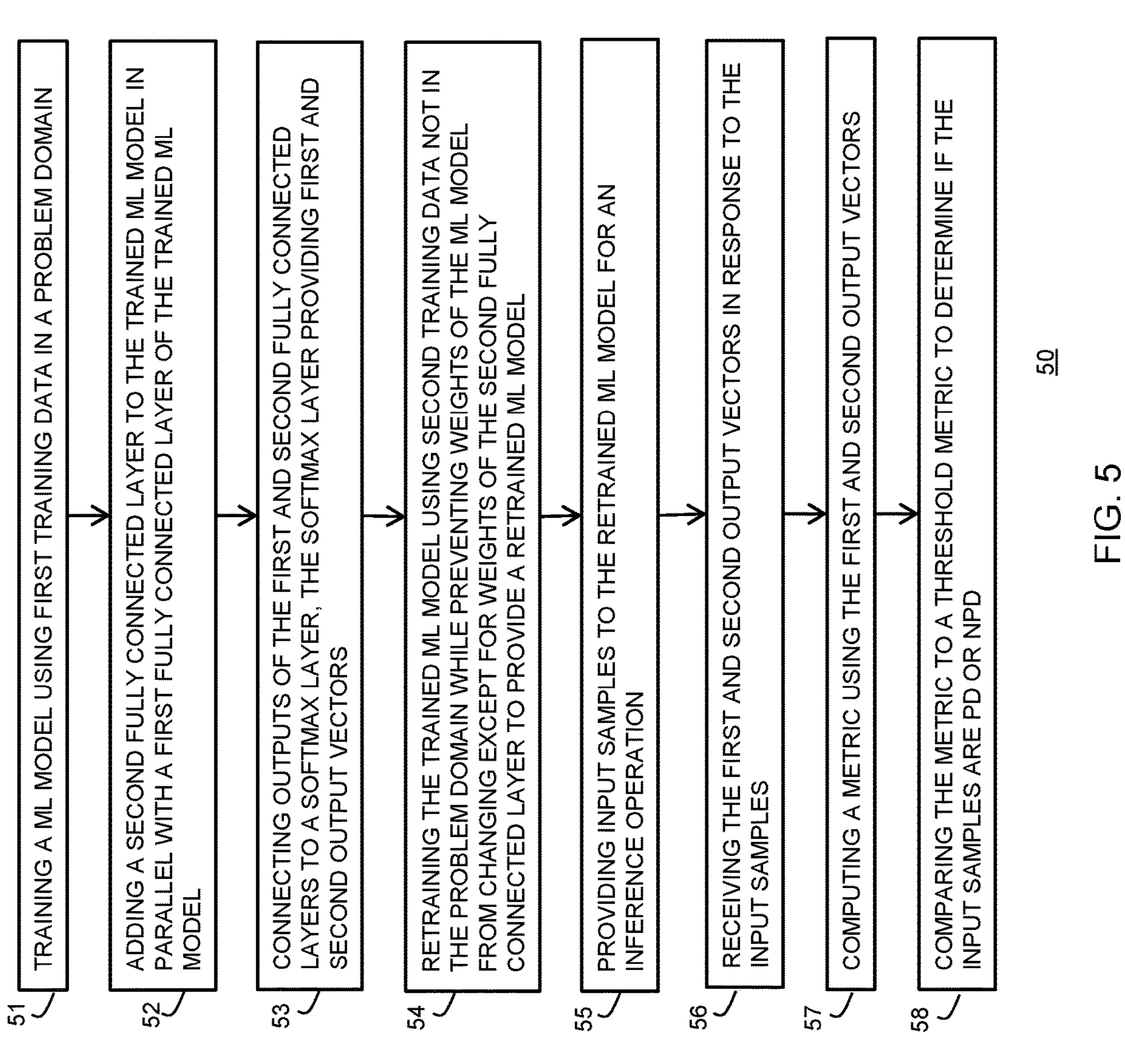
FIG. 5 illustrates a method for detecting NPD input samples in a machine learning model in accordance with an embodiment.

FIG. 5 illustrates method 50 for protecting a machine learning (ML) model from being copied in accordance with an embodiment. Method 50 begins at block 51. At block 51, a ML model is trained using first training data in a problem domain to produce a trained ML model. At block 52, a second fully connected layer is added to the trained ML model in parallel with a first fully connected layer of the trained ML model. At block 53, outputs of the first and second fully connected layers are connected to a Softmax layer. Outputs of the Softmax layer provide a first output vector corresponding to the first fully connected layer and a second output vector corresponding to the second fully connected layer. At block 54, the trained ML model is retrained using second training data not in the problem domain. Weights of the ML model are prevented from changing during the retraining except for weights of the second fully connected layer. At block 55, input samples are provided to the retrained ML model for an inference operation. At block 56, the first and second output vectors are provided in response to the input samples. At block 57, a metric is computed using the first and second output vectors. The metric may include a mean value of both output vectors, a proportion of the mean values, and the logarithm taken of the proportion to compute the metric. The metric may be computed differently in other embodiments. At block 58, the metric is compared to a threshold metric to determine if the input samples are PD or NPD. If the input samples are NPD, then an indication may be provided that the ML model may be under a copying attack. If the ML model is under attack, an action may be may taken to protect against the attack.

A device having the ML model, or a host processor, can then decide to either immediately take action, or to only take action after this has happened a given number of times. Example actions that can be taken include limiting the number of queries that can be made in a given time window (throttling), reporting the possible attack to a host processor, and moving inference operation to a lower-quality model. Furthermore, immediate action may be taken, or action may be taken only after a number of NPD samples have been detected.

Figure 6:
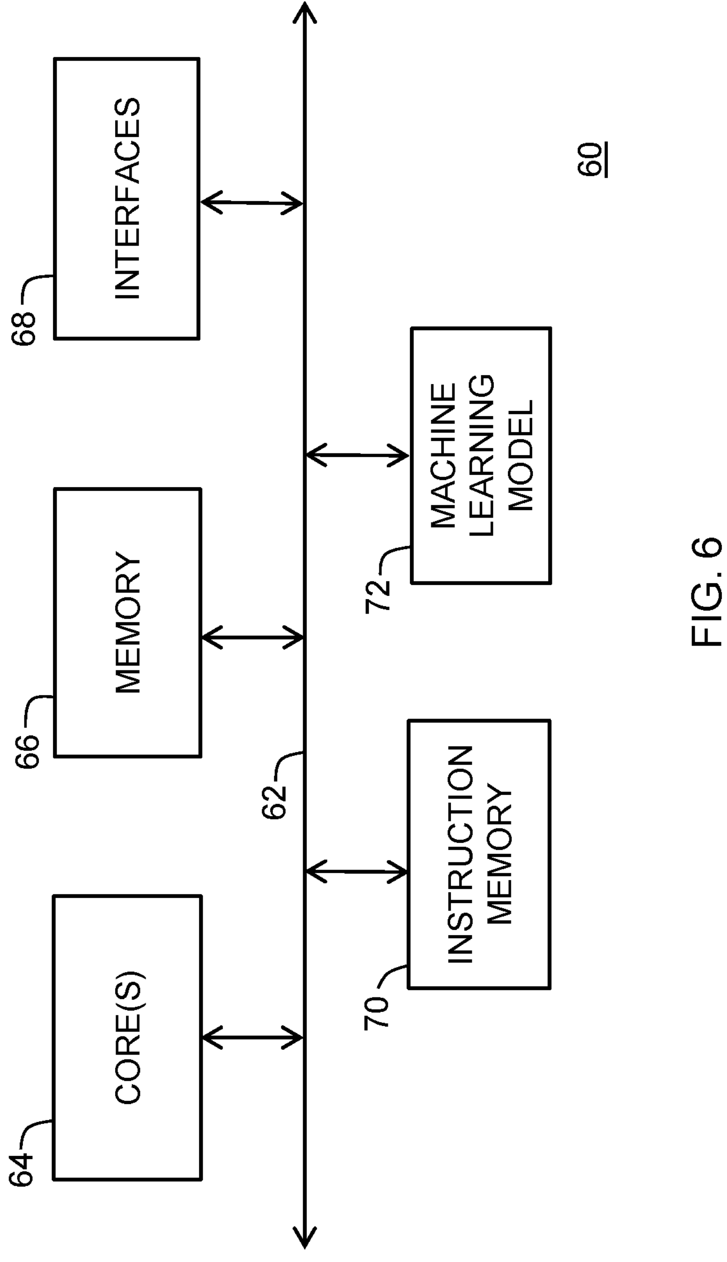
FIG. 6 illustrates a data processing system useful for implementing the illustrated embodiments.

FIG. 6 illustrates data processing system 60 useful for implementing an embodiment of the present invention. Data processing system 60 may be implemented on one or more integrated circuits. Data processing system 60 includes bus 62. In other embodiments, bus 62 may be a switching network or other form of interconnection for communication between modules or circuit blocks. Connected to bus 62 is one or more processor cores 64, memory 66, interfaces 68, instruction memory 70, and ML model 72. The one or more processor cores 64 may include any hardware device capable of executing instructions stored in memory 66 or instruction memory 70. For example, processor cores 64 may execute the ML algorithms used for training and operating ML model 72 and for computing the output vectors and NPD detection according the disclosed embodiments. Processor cores 64 may be, for example, a microprocessor, field programmable gate array (FPGA), application-specific integrated circuit (ASIC), or similar device. Processor cores 64 may be implemented in a secure hardware element and may be tamper resistant.

Memory 66 may be any kind of memory, such as for example, L1, L2, or L3 cache or system memory. Memory 76 may include volatile memory such as static random-access memory (SRAM) or dynamic RAM (DRAM), or may include non-volatile memory such as flash memory, read only memory (ROM), or other volatile or non-volatile memory. Also, memory 66 may be implemented in a secure hardware element. Alternately, memory 66 may be a hard drive implemented externally to data processing system 60. Memory 66 may be a secure memory and may be used to store the ML model, and to store the weights and biases for the ML model.

Interfaces 68 may be connected to one or more devices for enabling communication with a user such as an administrator. For example, interfaces 68 may be enabled for coupling to a display, a mouse, a keyboard, or other input/output device. Interfaces 68 may include one or more devices for enabling communication with other hardware devices. For example, interfaces 68 may include, or be coupled to, a network interface card (NIC) configured to communicate according to the Ethernet protocol. Also, interfaces 68 may implement a TCP/IP stack for communication according to the TCP/IP protocols. Also, interfaces 68 may include an application programming interface (API) for interfacing an application with another program, such as an operating system (OS) of data processing system 60. Data samples for classification by ML model 72 may be input via interfaces 68, such as an API or similar interfaces. Various other hardware or configurations for communicating are available.

Instruction memory 70 may include one or more machine-readable storage media for storing instructions for execution by processor cores 64. For example, instruction memory 70 may store instructions for implementing the computations used to protect the ML model from copying. In other embodiments, both memories 66 and 70 may store data upon which processor cores 64 may operate. Memories 66 and 70 may also store, for example, encryption, decryption, and verification applications used to protect sensitive ML model 72. Memories 66 and 70 may be implemented in a secure hardware element such as a secure element (SE) or trusted execution environment (TEE) and be tamper resistant.

Machine learning model 72 may include trained ML model 16 of FIG. 1 as modified with the described method for protecting the ML model from extraction, or copying.

Machine learning model 72 may run on one or more of processor cores 64 or run on its own co-processor (not shown). Also, in one embodiment, ML model 72 may be stored in its own dedicated secure storage of memory 66 or stored encrypted in an unsecure memory portion of memory 66.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, or other computing device. The non-transitory machine-readable storage medium may include volatile and non-volatile memories such as read only memory (ROM), random access memory (RAM), magnetic disk storage media, optical storage medium, flash memory, and the like. The non-transitory machine-readable storage medium excludes transitory signals.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for detecting non-problem domain input samples provided to a machine learning (ML), the method comprising:

training the ML model using problem domain training data to provide a trained ML model, wherein the trained ML model having a first fully connected layer and a first softmax layer for providing first classification predictions;

adding a second fully connected layer to the trained ML model in parallel with the first fully connected layer, and a second softmax layer connected to an output of the first fully connected layer for providing a first output vector and to an output of the second fully connected layer for providing a second output vector;

retraining the trained ML model using non-problem domain training data that is not in the problem domain to provide a retrained ML model for providing second classification predictions from the second softmax layer, wherein weights of all layers of the ML model are prevented from being changed during the retraining except for weights of the second fully connected layer;

providing a plurality of input samples to an input of the retrained ML model for an inference operation;

receiving an output vector from the second softmax layer of the retrained ML model;

computing a metric using the first and second output vectors from the second softmax layer; and comparing the metric to a threshold metric to determine if the plurality of input samples are problem domain or non-problem domain.

2. The method of claim 1, wherein computing the metric further comprises taking a first mean value of the first output vector, taking a second mean value of the second output vector, and computing a proportion using the first and second mean values.

3. The method of claim 2, further comprising taking a logarithm of the proportion.

4. The method of claim 1, wherein computing the metric further comprises subtracting a first mean of the second output vector from a second mean of the first output vector.

5. The method of claim 1, wherein computing the metric further comprises subtracting a sum of the second output vector from a sum of the first output vector.

6. The method of claim 1, wherein computing the metric further comprises taking a proportion using a sum of the second output vector and a sum of the first output vector.

7. The method of claim 6, further comprising taking a logarithm of the proportion.

8. The method of claim 1, wherein the ML model comprises a neural network.

9. The method of claim 1, wherein the non-problem domain training data comprises classes of samples not related to classes of samples the problem domain training data.

10. The method of claim 1, further comprising taking an action to protect the ML model comprising one or more of limiting a number of input samples within a time window, reporting the copying attempt to a host processor, and substituting a lower quality ML model.

11. A non-transitory storage medium comprising processor-readable instructions that, when executed, cause at least one processor core to provide a machine learning (ML) model, the ML model comprising:

an input layer for receiving input samples;

a plurality of intermediate layers coupled to the input layer;

a first fully connected layer coupled to an output of a final intermediate layer, wherein the first fully connected layer includes weights trained using problem domain data;

a second fully connected layer coupled to the output of the final intermediate layer, wherein the second fully connected layer includes weights trained using non-problem domain data;

a softmax layer coupled to an output of the first fully connected layer for output a first vector, and to an output of the second fully connected layers for outputting a second vector;

a non-problem domain detector coupled to receive the first and second vectors and to compute a metric using the first and second vectors; and a comparator for comparing the metric to a threshold, wherein non-problem domain samples are detected when the metric does not compare favorably to the threshold.

12. The non-transitory storage medium of claim 11, wherein the metric further comprises taking a first mean value of elements of the first vector, taking a second mean value of elements of the second vector, and taking a proportion using the first and second mean values.

13. The non-transitory storage medium of claim 12, further comprising the non-problem domain detector taking a logarithm of the proportion.

14. The non-transitory storage medium of claim 11, wherein the metric further comprises a subtraction of a first mean value of elements of the second vector from a second mean value of elements of the first vector.

15. The non-transitory storage medium of claim 11, wherein the metric further comprises a subtraction of a sum of elements of the second output vector from a sum of elements of the first output vector.

16. The non-transitory storage medium of claim 11, wherein the metric further comprises taking a proportion using a sum of elements of the second vector and a sum of elements of the first vector.

17. The non-transitory storage medium of claim 16, further comprising taking a logarithm of the proportion.

18. The non-transitory storage medium of claim 11, wherein the ML model is used for image classification.

19. The non-transitory storage medium of claim 11, further comprising an action taken to protect the ML model comprises one or more of limiting the number of samples that can be input in a given time window, reporting the copying attempt to a host processor, and substituting a lower quality ML model.

20. The non-transitory storage medium of claim 11, wherein the ML model comprises a neural network.

* * * * *